United States Patent [19]
Lishman

[11] Patent Number: 5,351,437
[45] Date of Patent: Oct. 4, 1994

[54] MOISTURE SENSITIVE IRRIGATION CONTROL SYSTEM

[76] Inventor: Fred W. Lishman, 2517 Farmcrest Dr., #125, Herndon, Va. 22070

[21] Appl. No.: 881,664

[22] Filed: May 12, 1992

[51] Int. Cl.$^5$ .................................... A01G 25/00
[52] U.S. Cl. .................................................. 47/79
[58] Field of Search ............................ 47/79, 67, 48.5

[56] References Cited

U.S. PATENT DOCUMENTS

| | | | |
|---|---|---|---|
| 2,198,309 | 4/1940 | James | 47/79 |
| 2,281,068 | 4/1942 | Farnham | 47/79 |
| 2,743,552 | 5/1956 | Hunter | 47/79 |
| 4,825,591 | 5/1989 | Han | 47/79 |

FOREIGN PATENT DOCUMENTS

| | | | |
|---|---|---|---|
| 12545 | 3/1956 | Fed. Rep. of Germany | 47/79 |
| 2336739 | 3/1974 | Fed. Rep. of Germany | 47/48.5 G |
| 1389971 | 4/1975 | United Kingdom | 239/542 |
| 2240249 | 7/1991 | United Kingdom | 47/79 |

Primary Examiner—Ramon S. Britts
Assistant Examiner—Joanne C. Downs
Attorney, Agent, or Firm—Rothwell, Figg, Ernst & Kurz

[57] ABSTRACT

A moisture sensitive irrigation control system provides automatic watering of potted plants, lawns, crops, etc. The system utilizes a control valve to effect watering of the soil upon automatic detection of a predetermined level of dryness in a control sample of the soil. The system uses a weight-based method of detecting the amount of moisture in the control sample to regulate the automatic release of a predetermined amount of water into the entire soil for rehydration thereof. As the weight of the control sample increases with the volume of water, the valve is automatically closed to terminate the irrigation process.

17 Claims, 4 Drawing Sheets

MOISTURE SENSITIVE IRRIGATION CONTROL SYSTEM

BACKGROUND OF THE INVENTION

This invention relates to a system for performing automatic irrigation of soil containing plants or other vegetation based upon the constant monitoring of the moisture content of the soil. The present invention ensures water conservation, especially when used in large scale applications.

For the individual plant owner, the present invention ensures a constant periodic supply of water to multiple potted plants for an extended period of time without the inconvenience and guesswork associated with manual watering of the plants. The irrigation control system of the present invention also provides an aesthetically pleasing display of the plants being watered. Unlike the irrigation systems which employ capillary action (wicks) to effect watering, such as disclosed in U.S. Pat. No. 4,171,593, the present invention may also allow periodic drying out of the roots prior to rehydration if desirable, which thereby ensures the health of the plants. Because the present invention provides watering of the plants from above the soil, harmful salts do not accumulate in the soil as occurs with irrigation systems that employ capillary action, which pulls water up from below.

Moisture sensitive irrigation systems are generally known. In particular, my own U.S. Pat. No. 5,020,261 discloses a self-watering planter which activates a watering mechanism when the weight of a liner filled with soil decreases through evaporation of water. However, this self-watering planter is completely self-contained, in that the water supply, liner and moisture detecting mechanisms are all integrally combined within the planter housing. Thus, it is not possible to utilize the self-watering feature with conventional planters or pots, and separate units are required for each plant.

Additionally, large area irrigation control systems are disclosed in U.S. Pat. Nos. 2,577,337 and 2,781,228. These control systems are characterized by complex counterweight balancing control and valve mechanisms, and complicated electrical circuitry. Consequently, there exists a need in the art to provide a simpler, more cost-effective irrigation control system which overcomes the disadvantages of the prior art.

SUMMARY OF THE INVENTION

It is thus an object of the present invention to overcome the problems and limitations of the prior art as discussed above.

It is another object of the present invention to provide a system which conserves water during irrigation.

It is a further object of the present invention to eliminate the need for periodic manual watering of potted plants by a plant owner.

It is a still further object of the present invention to provide an irrigation control system which is aesthetically pleasing and is readily portable.

It is a still further object of the present invention to provide a moisture sensitive irrigation control system which effects top-watering of multiple potted plants upon detection of a predetermined level of dryness of the soil in one of the planters (chosen to be the control) based upon the planter's weight.

The objects of the present invention are fulfilled by providing an irrigation control system comprising, in a first preferred embodiment, a base unit with raised platforms for displaying potted plants, a water reservoir located at the top of a water tower, weight determination means (configured as one of the raised platforms) for determining the weight of the control planter, which is indicative of the moisture content of its soil, feeder tubes which extend from the potted plants to the water tower, valve means connecting the feeder tubes to the reservoir for selectively allowing water to be delivered to the potted plants, and control means, responsive to the weight determination means determining a specific weight of the control planter for opening and closing the valve means when the weight of the planter reaches first and second specific values respectively.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE PREFERRED EMBODIMENTS

Figure 1:
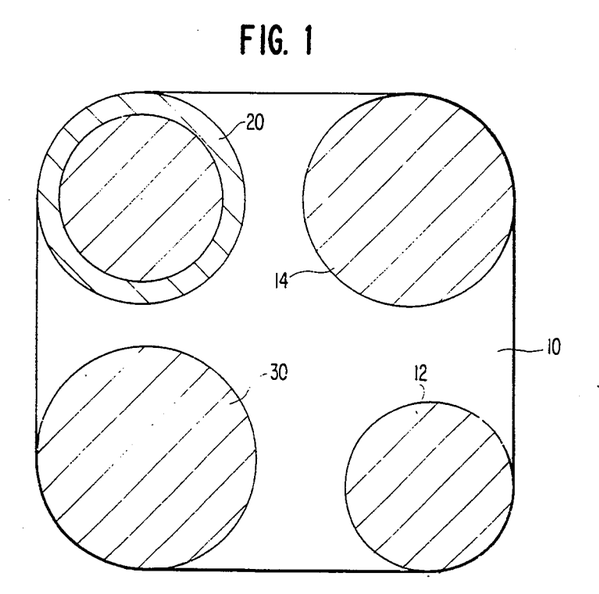
FIG. 1 is a plan view of the base unit of the irrigation control system of one preferred embodiment of the present invention.

FIG. 1 illustrates a first preferred embodiment of the present invention wherein a base unit 10 is provided that is generally of rectangular shape having raised platforms 12 and 14 for displaying multiple potted plants. The rear platform 14 is elevated more than the front platform 12 to enhance the appearance of the display. A control platform 30 (on which the control planter is placed) and water tower 20 are also situated on the base unit.

Figure 2:
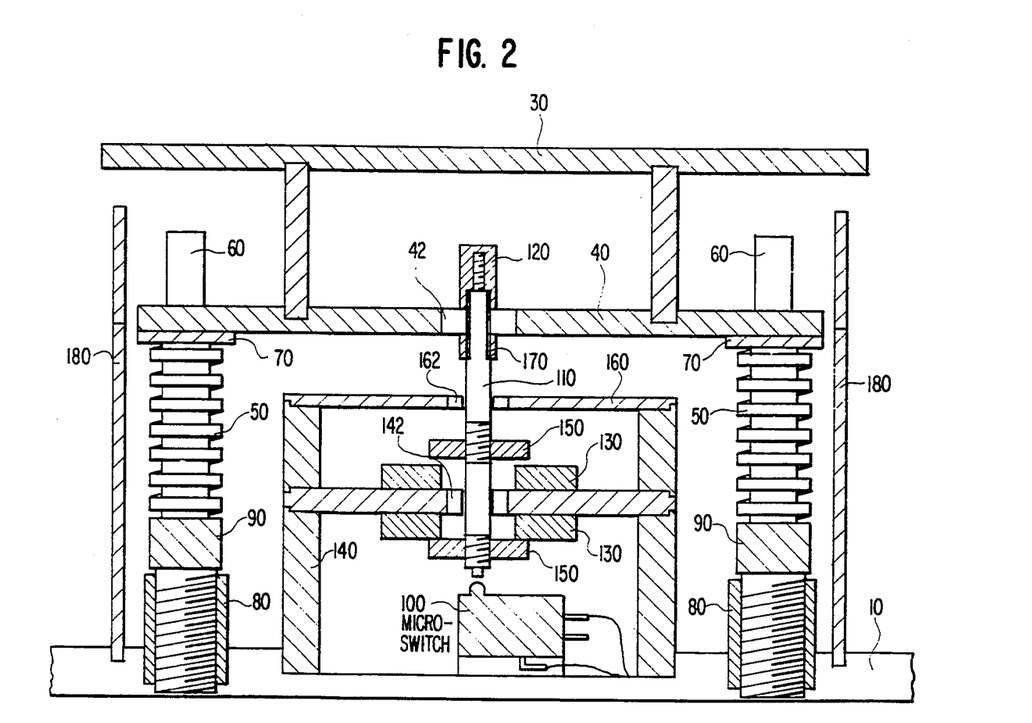
FIG. 2 is a cross-sectional view of the control platform 30 of FIG. 1.

As shown in FIG. 2, the control platform 30 sits atop a base plate 40. The base plate is supported by compression springs 50 that are maintained in an upright position by a number of posts 60 that pass through holes in the periphery of the base plate 40. Washers 70 are placed on the posts between the springs and the base plate. The posts are threaded into receptacles 80 mounted in the base unit 10. The posts 60 are threaded so that they can be rotated in order to fine tune the compression on the springs. Washers 90 are also provided in varying thicknesses to be placed on the posts in order to make gross adjustments in the spring compression.

A normally closed micro-switch 100 is mounted on the base unit 10. A movable column 110 is used to operate the micro-switch. The upper end of the column passes through a bearing 42 in the center of the base plate 40 and is secured to the base plate 40 by a threaded cap 120. First and second ring magnets 130 are mounted on a cylindrical base 140 and surround the column. The column 110 passes through a bearing 142 located in the center of the base 140. First and second steel washers 150 are attached to the column 110 above and below the respective magnets by an attachment mechanism such as a threaded groove. However, it is to be noted that other modes of attaching the washers to the column can equivalently be used. A cover 160 for the base 140 also has a bearing 162 located in its center through which the column 110 passes. A washer 170 rests on a shoulder of the column beneath the base plate 40. The thickness of the washer 170 determines the amount of water delivered during irrigation, as explained below. The weight determination and control mechanisms are enclosed within a hollow cylinder 180.

Figure 3:
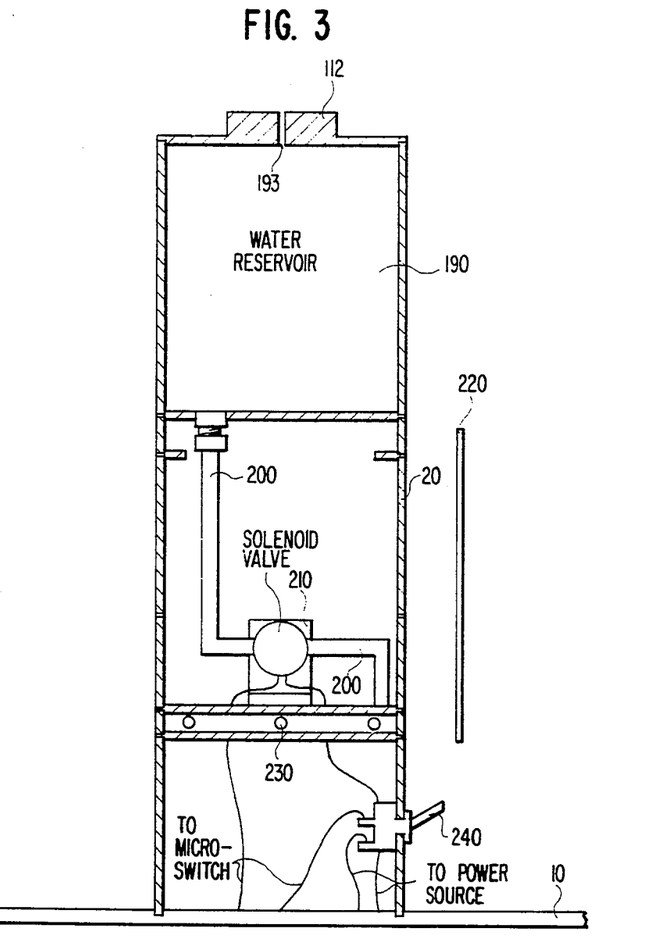
FIG. 3 is a cross-sectional view of the water tower 20 of FIG. 1.

With reference to FIG. 3, a water reservoir 190 sits atop the water tower 20 at a height producing sufficient water pressure to irrigate the potted plants. The water reservoir has a cover 192 with a small hole 193 in its center to equalize pressure. Flexible tubing 200 connects the water reservoir to a normally closed solenoid valve 210. The flexible tubing also connects the solenoid valve to flexible feeder tubes 220, which are placed in each of the potted plants. The feeder tubes are passed through openings 230 in the water tower and plugged into holes (not shown) in the segment of flexible tubing 200 connecting the solenoid valve to the openings 230. An external on-off switch 240 is located near the base of the water tower.

Figure 4:
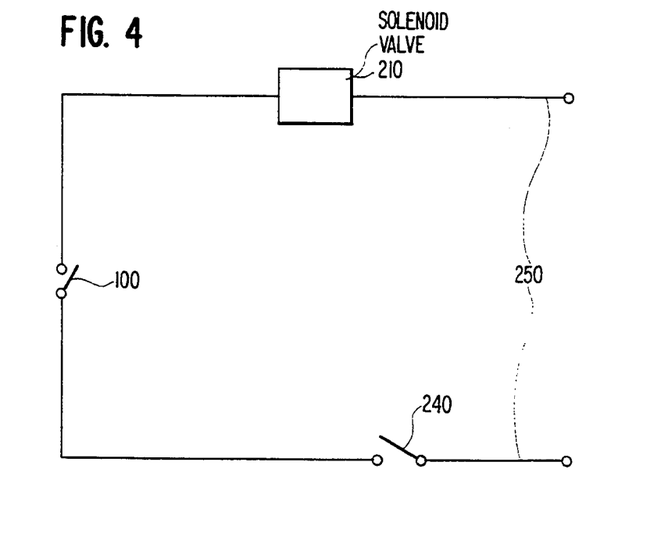
FIG. 4 is a schematic view of the electrical circuit used to actuate the solenoid valve 210 of FIG. 3.

FIG. 4 illustrates schematically the electrical circuit that is part of the control means used to actuate the solenoid valve. The electrical circuit consists of power supply feed lines 250, an external on-off switch 240, a normally closed micro-switch 100, and a normally closed solenoid valve 210.

As mentioned earlier during the discussion of FIG. 2, the amount of compression on the springs 50 can be adjusted by either varying the thickness of the washers 90 or by rotating the posts 60 in the threaded receptacles 80, or both. This adjustability ensures proper operation of the irrigation control system regardless of the initial weight of the potted plant (chosen to be the control), or the subsequent weight of the potted plant resulting from growth.

DESCRIPTION OF OPERATION

The irrigation control system operates as follows: As evaporation occurs, the weight of the potted plants decrease. The decreased weight of the control planter mounted on control platform 30 causes the springs 50 to produce an upward force on the base plate 40 that is translated to the column 110 through the cap 120. Evaporation continues until a first predetermined weight (level of dryness) is reached, at which point the attractive force between the upper ring magnet 130 and upper steel washer 150 is overcome, the column is forced upward, the micro-switch 100 is closed by releasing the switch contact normally pressed inward by column 110, the solenoid valve 210 is opened, and irrigation is initiated.

As the potted plants are irrigated, their weights increase. The increased weight of the control planter produces a downward force on the base plate 40 that is translated to the column 110 through the washer 170. Irrigation proceeds until a second predetermined weight (level of wetness) is reached, at which point the attractive force between the lower ring magnet 130 and lower steel washer 150 is overcome, the column is forced downward, the micro-switch 100 is opened, the solenoid valve 210 is closed, and irrigation is terminated. The volume of water that is delivered to the control planter can be adjusted by varying the thickness of the washer 170 thereby changing the distance that the base plate 40 must travel before the base plate contacts the washer 170 thereby exerting downward force on the column 110. The volume of water delivered to the other potted plants can be adjusted by varying the number, diameter, or length of the feeder tubes 220.

Figure 5:
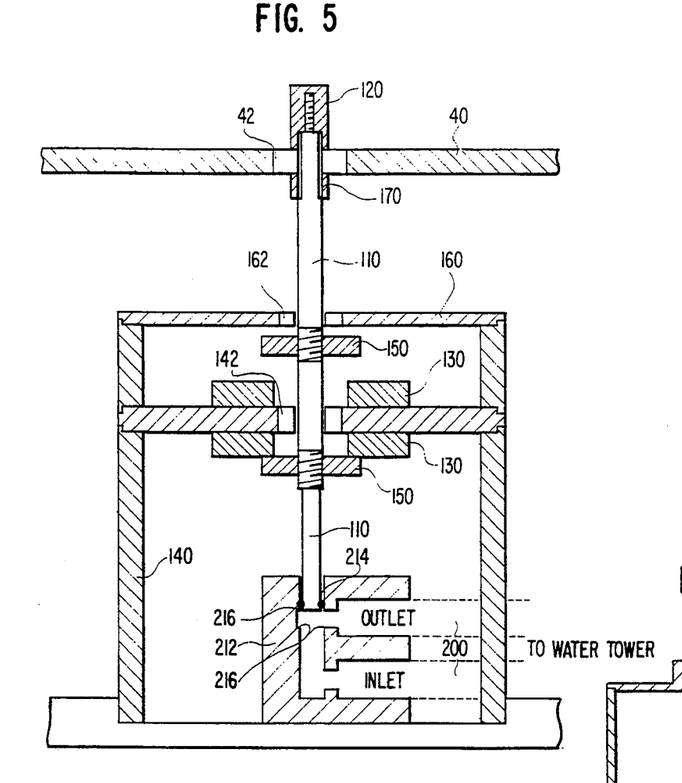
FIG. 5 is a cross-sectional view of a mechanical valve assembly of a second preferred embodiment of the present invention.
Figure 6:
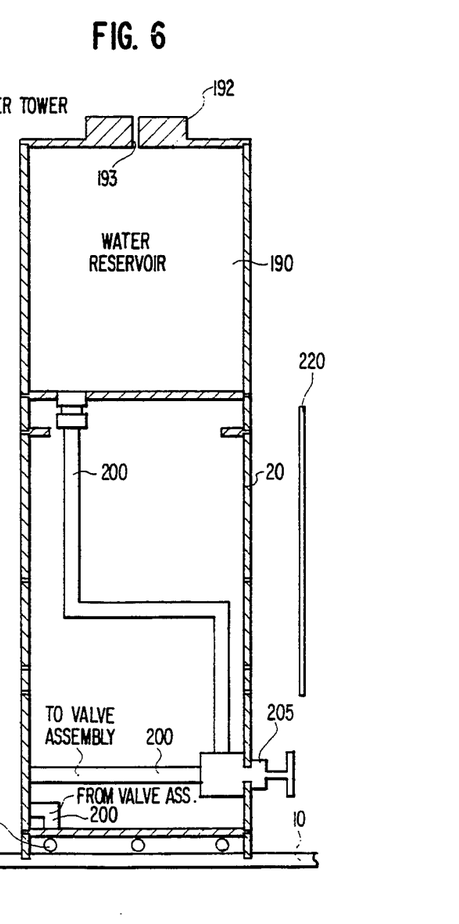
FIG. 6 is a cross-sectional view of the water tower of a second preferred embodiment of the present invention.

FIGS. 5 and 6 are illustrative of a second preferred embodiment of the present invention in which the electrical circuit in FIG. 4 is substituted by a mechanical assembly. The mechanical valve assembly shown in FIG. 5 is used to replace both the micro-switch 100 as well as the solenoid valve 210. A manual shut-off valve 205 illustrated in FIG. 6 is used to replace the on-off switch 240. The remaining elements similar to the first embodiment are denoted by like reference numerals and their description is thus omitted.

With reference to FIG. 5, the valve assembly consists of a valve body 212 having horizontal inlet and outlet ports with an interior vertical passage near the center of the valve body allowing communication therebetween. The movable valve stem 110 has one end inserted into the interior passage of the valve body 212 and includes an O-ring 214 at a terminal end thereof. A tapered groove 216 is provided near the center of the interior passage which keeps the O-ring from being damaged by the sharp edges created by the intersection of the outlet port with the interior passage. The taper further facilitates the movement of the O-ring from the illustrated open position to a closed position in which the O-ring is located below the outlet port by reducing the friction between the passage and the O-ring.

As illustrated in FIG. 6, the water tower 20 contains a manual shut-off valve 205 replacing the on-off switch. Flexible tubing 200 connects the water reservoir 190 to the manual shut-off valve 205. The flexible tubing also connects the shut-off valve 205 to the inlet port of the valve body 212 shown in FIG. 5, as well as connecting the outlet port of the valve body to the flexible feeder tubes 220 in the water tower 20. The feeder tubes are placed in each of the potted plants. The feeder tubes are passed through openings 230 near the base of the water tower and plugged into holes in the flexible tubing 200.

Figure 7:
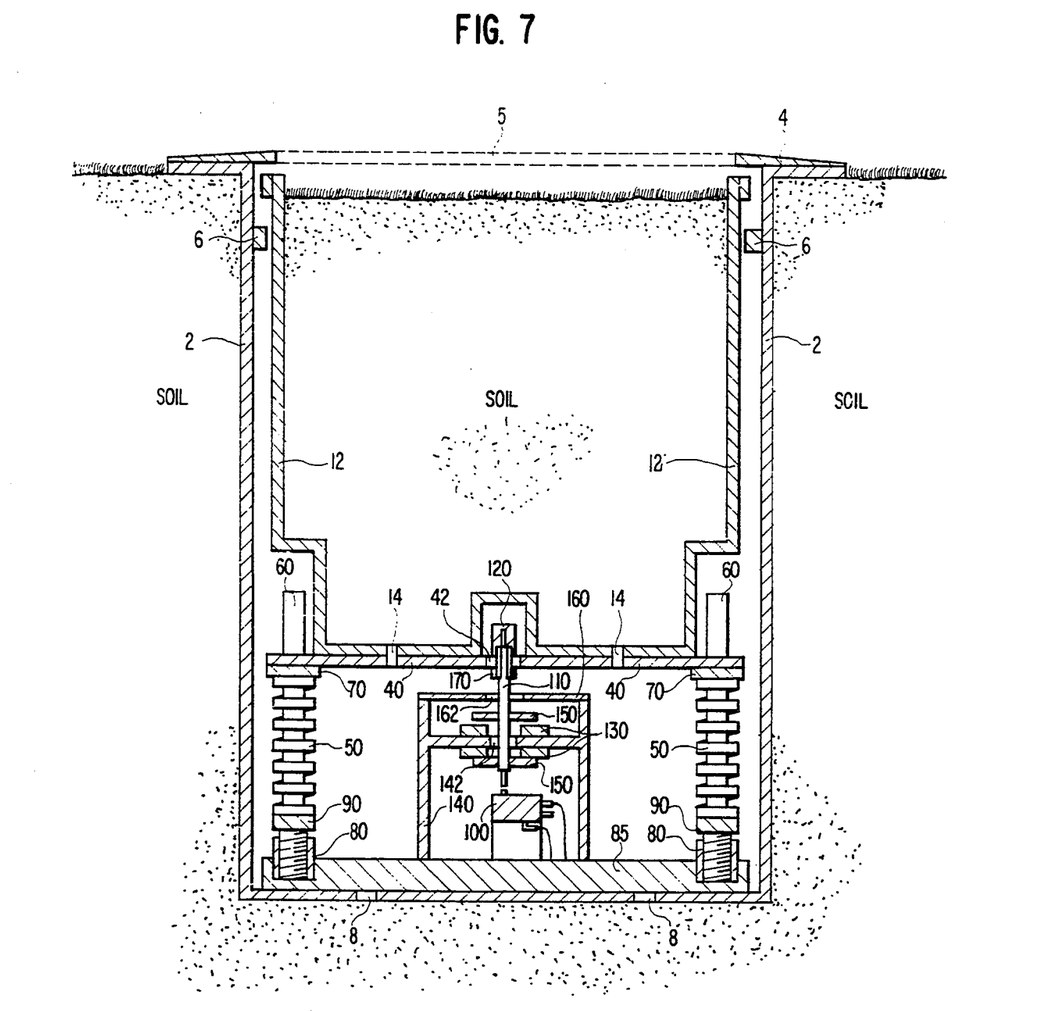
FIG. 7 is a cross-sectional view of the irrigation control system of a third preferred embodiment of the present invention.

FIG. 7 illustrates a third preferred embodiment of the present invention wherein a cylindrical housing unit 2 is provided for installation in the ground. A cover 4 which has a grate 5 in its center is mounted on the top of the housing unit. A number of bearings 6 are located near the top interior of the housing unit. Holes 8 are provided in the bottom of the housing unit for drainage. A liner 12, into which a control sample of soil and vegetation is placed, is removably inserted into the center of the housing unit. Drainage holes 14 are provided in the bottom of the liner to allow water drainage of the soil.

As shown in FIG. 7, the liner 12 sits atop a base plate 40. The base plate is supported by compression springs 50 that are maintained in an upright position by a number of posts 60 that pass through holes in the periphery of the base plate. Washers 70 are placed on the posts between the springs and the base plate. The posts are threaded into receptacles 80 located in a base unit 85. The posts are threaded so that they can be rotated in order to fine tune the compression on the springs. Washers 90 are also provided in varying thicknesses to be placed on the posts in order to make large adjustments in the spring compression.

Referring again to FIG. 7, a normally closed micro-switch 100 is mounted on the base unit 85. A movable column 110 is used to operate the micro-switch. The upper end of the column passes through a bearing 42 in the center of the base plate 40 and is secured to the base plate by a threaded cap 120. First and second ring magnets 130 are mounted on a base 140 and surround the column. The column passes through a bearing 142 located in the center of the base. First and second steel washers 150 are attached to the column above and below the respective magnets by an attachment mechanism such as a threaded groove. However, it is to be noted that other modes of attaching the washers to the column can equivalently be used. A cover 160 for the base also has a bearing 162 located in its center through which the column passes. A washer 170 rests on a shoulder of the column beneath the base plate.

The irrigation control system shown in FIG. 7 is placed in the ground in a uniformly irrigated area. The control system operates a remotely located solenoid valve (not shown) that controls the irrigation process for the area by selectively controlling the supply of water from a water source such as a water tower or water main. The soil and vegetation placed in the liner 12 are the same as the surrounding soil and vegetation, and thus the moisture content of the soil in the liner is a sample representation of the moisture content of the surrounding soil.

The irrigation control system of the third embodiment operates as follows: As evaporation occurs, the weight of the liner 12 decreases. The decreased weight of the liner causes the springs 50 to produce an upward force on the base plate 40 that is translated to the column 110 through the cap 120. Evaporation continues until a first predetermined weight (level of dryness) is reached, at which point the attractive force between the upper ring magnet 130 and upper steel washer 150 is overcome, the column is forced upward, the micro-switch 100 is closed, a solenoid valve is opened, and irrigation is initiated.

As the soil is irrigated, its weight increases. The increased weight of the liner 12 produces a downward force on the base plate 40 that is translated to the column 110 through the washer 170. Irrigation proceeds until a second predetermined weight (level of wetness) is reached, at which point the attractive force between the lower ring magnet 130 and lower steel washer 150 is overcome, the column is forced downward, the micro-switch 100 is opened, a solenoid valve is closed, and irrigation is terminated. The volume of water that is delivered during irrigation can be adjusted by varying the thickness of the washer 170 thereby changing the amount of travel that the base plate must make before exerting force on the column.

It should be noted that the mechanical valve assembly of FIG. 5 may also be substituted for the microswitch-solenoid valve mechanism of the embodiment of FIG. 7.

The invention having been thus described, it will be obvious to those skilled in the art that the same may be varied in many ways without departing from the spirit of the invention. Any and all such modifications are intended to be included within the scope of the following claims.

What is claimed is:

1. A moisture sensitive irrigation system for controlling irrigation of multiple volumes of soil, comprising:
   a supply of water;
   means for containing a control volume of soil, the moisture content of which is indicative of the moisture content of said multiple volumes of soil;
   means for detecting the moisture content of said control volume of soil; and
   means for irrigating each of said multiple volumes of soil including said control volume when said means for detecting has detected that the moisture content of said control volume of soil has reached a predetermined low threshold, and for terminating said irrigation when the moisture content of said control volume of soil has reached a predetermined high threshold;
   wherein said means for detecting comprises spring-biased weight responsive means for operating said means for irrigating by operatively communicating with said means for irrigating upon said control volume of soil reaching a weight corresponding to said predetermined low and high thresholds.

2. The moisture sensitive irrigation system according to claim 1, wherein said means for containing a control volume of soil comprises a planter or pot filled with said soil.

3. The moisture sensitive irrigation system according to claim 2, wherein said planter or pot contains at least one plant planted in said soil.

4. The moisture sensitive irrigation system according to claim 1, wherein said means for containing a control volume of soil comprises a liner filled with said soil and installed in the ground surrounded by said multiple volumes of soil.

5. The moisture sensitive irrigation system according to claim 4, wherein said liner contains vegetation planted in said soil.

6. The moisture sensitive irrigation system according to claim 1, wherein said weight responsive means comprises a platform upon which said means for containing is mounted, adjustable compression springs providing a force on said platform in a direction opposite to the weight force of said control volume of soil, and switch means coupled to said means for irrigating for controlling operation thereof, said switch means being activated upon the weight of said control volume reaching a level corresponding to said low threshold, and said switch means being deactivated upon the weight of said control volume reaching a level corresponding to said high threshold.

7. The moisture sensitive irrigation system according to claim 6, wherein said means for irrigating comprises a solenoid valve coupled to said supply of water, and controlled by activation of said switch means.

8. The moisture sensitive irrigation system according to claim 1, wherein said weight responsive means comprises a platform upon which said means for containing is mounted, adjustable compression springs providing a force on said platform in a direction opposite to the weight force of said control volume of soil, and control means coupled to said means for irrigating for controlling operation thereof, said control means activating said means for irrigating upon the weight of said control volume reaching a level corresponding to said low threshold, and said control means deactivating said means for irrigating upon the weight of said control volume reaching a level corresponding to said high threshold.

9. The moisture sensitive irrigation system according to claim 8, wherein said means for irrigating comprises a valve having an inlet port coupled to said supply of water, an outlet port coupled to said multiple volumes of soil, and a passage communicating between said inlet and outlet ports to provide a path therebetween, said control means comprises a valve stem inserted into said passage and coupled at one end thereof to said platform, for blocking said path upon the weight of said control volume reaching a level corresponding to said high threshold, and for withdrawing out of said path upon the weight of said control volume reaching a level corresponding to said low threshold.

10. The moisture sensitive irrigation system according to claim 2, further comprising a base unit including a plurality of platforms each for holding a potted plant, and wherein said supply of water comprises a water tower mounted on said base unit, wherein one of said platforms comprises said means for detecting, and which is operatively coupled to said means for irrigating which is located within said water tower.

11. A moisture sensitive irrigation system, comprising:
a base unit including a plurality of platforms, each for holding a potted plant and soil, and a water tower including a supply of water and means for irrigating each of said potted plants;
wherein one of said plurality of platforms includes moisture detecting means for detecting the level of moisture of the soil in the pot held thereon, said level of moisture being indicative of the moisture levels of soil in other pots held on said plurality of platforms, which other pots do not include moisture detecting means, for activating said means for irrigating upon detection of said level of moisture reaching a predetermined low threshold to irrigate the soil in said other pots, ad for deactivating said means for irrigating upon detection of said level of moisture reaching a predetermined high level.

12. The moisture sensitive irrigation system according to claim 11, wherein said moisture detecting means comprises said one platform upon which said pot is held, adjustable compression springs providing a force on said platform in a direction opposite to the weight force of said pot, and switch means coupled to said means for irrigating for controlling operation thereof.

13. The moisture sensitive irrigation system according to claim 12, wherein said means for irrigating comprises a solenoid valve located within said water tower and coupled between said supply of water and said potted plants, said solenoid valve being controlled by said switch means.

14. The moisture sensitive irrigation system according to claim 11, wherein said moisture detecting means comprises said one platform upon which said pot is held, adjustable compression springs providing a force on said platform in a direction opposite to the weight force of said pot, and control means coupled to a valve having an inlet port coupled to said supply of water, an outlet port coupled to said multiple volumes of water, and a passage communicating between said inlet and outlet ports to provide a path therebetween;
said control means comprising a valve stem inserted into said passage and coupled at one end thereof to said platform, for blocking said path upon the weight of said pot reaching a level corresponding to said high threshold, and for withdrawing out of said path upon the weight of said control volume reaching a level corresponding to said low threshold.

15. The moisture sensitive irrigation system according to claim 14, wherein said means for irrigating comprises a manual shut-off valve mounted in said water tower and coupled between said valve and said supply of water, and flexible tubing coupling said manual shut-off valve to said valve, and coupling said valve to said plurality of potted plants.

16. A moisture sensitive irrigation system for controlling irrigation of a large area of soil, comprising:
a liner filled with a control volume of soil installed in the ground within said large area, the weight of said liner being representative of the moisture content of said large area;
a spring-biased platform on which said liner is mounted, the vertical level of said spring-biased platform varying according to the weight of said liner;
means for irrigating said entire large area upon activation;
activating means, coupled to said platform, for activating said means for irrigating when said platform reaches a first predetermined vertical level corresponding to a low moisture content of said soil, and for deactivating said means for irrigating when said platform reaches a second predetermined vertical level corresponding to a high moisture content of said soil.

17. The moisture sensitive irrigation system according to claim 16, wherein said means for irrigating comprises a solenoid valve for controlling the flow of a supply of water for said large area of soil, and a switch located under said platform for opening and closing said solenoid valve; and
said means for activating comprises a column attached to said platform for opening said switch by contact to close said solenoid valve when said platform reaches said second predetermined vertical level, said switch being normally closed when said platform has reached said first predetermined vertical level.

* * * * *

UNITED STATES PATENT AND TRADEMARK OFFICE
CERTIFICATE OF CORRECTION

PATENT NO.  : 5,351,437
DATED       : October 4, 1994
INVENTOR(S) : Fred W. Lishman It is certified that error appears in the above-identified patent and that said Letters Patent is hereby corrected as shown below:

The title page, should be deleted to appear as per attached title page.

The sheets of drawings consisting of figures 1-7, should be deleted to appear as per attached sheets.

Signed and Sealed this

Twenty-eighth Day of November 1995

Attest:

BRUCE LEHMAN

Attesting Officer

Commissioner of Patents and Trademarks

United States Patent [19]
Lishman

[11] Patent Number: 5,351,437
[45] Date of Patent: Oct. 4, 1994

[54] MOISTURE SENSITIVE IRRIGATION CONTROL SYSTEM

[76] Inventor: Fred W. Lishman, 2517 Farmcrest Dr., #125, Herndon, Va. 22070

[21] Appl. No.: 881,664

[22] Filed: May 12, 1992

[51] Int. Cl.5 .................................. A01G 25/00
[52] U.S. Cl. .................................................. 47/79
[58] Field of Search ........................ 47/79, 67, 48.5

[56] References Cited

U.S. PATENT DOCUMENTS

| | | | |
|---|---|---|---|
| 2,198,309 | 4/1940 | James | 47/79 |
| 2,281,068 | 4/1942 | Farnham | 47/79 |
| 2,743,552 | 5/1956 | Hunter | 47/79 |
| 4,825,591 | 5/1989 | Han | 47/79 |

FOREIGN PATENT DOCUMENTS

| | | | |
|---|---|---|---|
| 12545 | 3/1956 | Fed. Rep. of Germany | 47/79 |
| 2336739 | 3/1974 | Fed. Rep. of Germany | 47/48.5 G |
| 1389971 | 4/1975 | United Kingdom | 239/542 |
| 2240249 | 7/1991 | United Kingdom | 47/79 |

*Primary Examiner*—Ramon S. Britts
*Assistant Examiner*—Joanne C. Downs
*Attorney, Agent, or Firm*—Rothwell, Figg, Ernst & Kurz

[57] ABSTRACT

A moisture sensitive irrigation control system provides automatic watering of potted plants, lawns, crops, etc. The system utilizes a control valve to effect watering of the soil upon automatic detection of a predetermined level of dryness in a control sample of the soil. The system uses a weight-based method of detecting the amount of moisture in the control sample to regulate the automatic release of a predetermined amount of water into the entire soil for rehydration thereof. As the weight of the control sample increases with the volume of water, the valve is automatically closed to terminate the irrigation process.

17 Claims, 4 Drawing Sheets